(12) United States Patent
Satran

(10) Patent No.: US 6,799,358 B2
(45) Date of Patent: Oct. 5, 2004

(54) METHOD FOR ASSEMBLING AND DISASSEMBLING CUTTING INSERTS

(75) Inventor: Amir Satran, Kfar Vradim (IL)

(73) Assignee: Iscar, Ltd., Tefen (IL)

(*) Notice: Subject to any disclaimer, the term of this patent is extended or adjusted under 35 U.S.C. 154(b) by 227 days.

(21) Appl. No.: 10/011,712

(22) Filed: Dec. 11, 2001

(65) Prior Publication Data

US 2002/0073527 A1 Jun. 20, 2002

(30) Foreign Application Priority Data

Dec. 20, 2000 (IL) .............................................. 140435

(51) Int. Cl.[7] .............................................. B23P 19/00
(52) U.S. Cl. .................. 29/426.1; 29/402.08; 81/436; 407/31; 407/58
(58) Field of Search .................. 81/52, 436; 29/402.08, 29/426.1, 426.5, 456, 525.11, 267; 83/839, 840, 664, 954; 408/231, 233; 407/31, 58, 47, 48, 51, 102, 103; D8/21, 29

(56) References Cited

U.S. PATENT DOCUMENTS

| | | | | |
|---|---|---|---|---|
| 2,479,756 A | * | 8/1949 | Mays | 407/102 |
| 2,621,688 A | * | 12/1952 | Wales | 81/436 |
| 4,566,357 A | * | 1/1986 | Carossino | 81/436 |
| 4,664,564 A | * | 5/1987 | Loqvist | 407/72 |
| 5,090,845 A | * | 2/1992 | Bentjens | 407/58 |
| D334,516 S | * | 4/1993 | Tsunoda | D8/29 |
| D396,785 S | * | 8/1998 | Macor | D8/21 |

* cited by examiner

Primary Examiner—David P. Bryant
(74) Attorney, Agent, or Firm—Womble Carlyle

(57) ABSTRACT

A method for assembling or disassembling cutting inserts mounted in a rotary cutting tool assembly (20). The cutting tool assembly comprises a plurality of coaxially mounted cutters (22) on a common shaft (24) having an axis of rotation (A). The cutters have insert receiving pockets (30) having threaded bores (38) substantially parallel to the axis of rotation (A). Each of the insert receiving pockets has a cutting insert (28) having a through bore that is substantially parallel to the axis of rotation (A). Each of the cutting inserts is secured by means of a clamping screw (36). Each clamping screw is tightened with a key (42), the key having a head portion (44) engaging the clamping screw and a holding portion (46) transversely directed to the axis (B) of the head portion.

26 Claims, 5 Drawing Sheets

METHOD FOR ASSEMBLING AND DISASSEMBLING CUTTING INSERTS

FIELD OF THE INVENTION

The present invention relates to a method for assembling and disassembling face mounted cutting inserts in multiple disc cutters.

BACKGROUND OF THE INVENTION

Disc cutters with face mounted cutting inserts (also known as tangential, lay-down and edge-on mounted inserts) are known. In such a disc cutter, the cutting inserts are mounted in insert receiving pockets located at the peripheral portion of the cutter body. Each insert receiving pocket has a pocket base wall that faces axially. The pocket base wall is provided with a threaded bore that is substantially parallel to the axis of rotation of the cutter within the range of 0° to 20°. Each cutting insert is mounted in an insert receiving pocket by means of a clamping screw that is directed substantially parallel to the axis of rotation of the cutter. The tightening or un-tightening of the clamping screw is done by means of an ordinary key, having an axis of rotation, in the form of a screwdriver or a "T" shaped key. Such a key has a head portion rotated with respect to an axis of rotation of the key and a holding portion connected to the head portion, spaced away therefrom and co-directionally therewith. Such a key engages the clamping screw and is directed so that its axis of rotation is substantially parallel to the axis of rotation of the cutter.

In some machining applications it is required to coaxially mount several disc cutters on a common shaft. Often, each cutter being axially displaced from an adjacent cutter a distance that is too small to enable the insertion of an ordinary key between two cutters in a direction such that the axis of rotation of the key is substantially parallel to the axis of rotation of the cutter. It is a common practice in the industry that, in order to initially mount cutting inserts in the face of the cutter, or to dismount worn cutting inserts and installing new ones, it is necessary to dismantle the disc cutters from the common shaft so that the insert receiving pockets are easily accessible. Such a dismantling of the cutters and re-assembling them on the common shaft is very time consuming. Furthermore, there is a need to re-adjust the cutters on the shaft each time they are re-assembled.

It is the object of the present invention to provide a method for assembling and disassembling face mounted cutting inserts in multiple disc cutters mounted on a common shaft without the necessity to dismantle the cutters from the shaft.

It is a further object of the present invention to provide a key for assembling and disassembling face mounted cutting inserts in multiple disc cutters.

SUMMARY OF THE INVENTION

In accordance with the present invention there is provided a method for assembling or disassembling cutting inserts, the method comprising the steps of:
- (a) providing a rotary cutting tool assembly (20) comprising a plurality of coaxially mounted cutters (22) on a common shaft (24) having an axis of rotation (A), each cutter having a cutter body (26) in the general form of a circular disc, at least one of the plurality of cutters having a radius (R) and insert receiving pockets (30) in a peripheral portion (32) thereof, each of said insert receiving pockets having a threaded bore (38) substantially parallel to the axis of rotation (A), the at least one of the plurality of cutters being axially displaced from an adjacent cutter by a given distance (W),
- (b) locating a cutting insert (28) having a through bore in each of the insert receiving pockets, the through bore being substantially parallel to the axis of rotation (A),
- (c) securing each of the cutting inserts by means of a clamping screw (36) passing through the through bore and threadingly engaging the threaded bore (38), and
- (d) tightening each clamping screw with a key (42), the key having a head portion (44), having a head axis (B), engaging the clamping screw and a holding portion (46) connected to the head portion and transversely directed to the head axis (B), the entire holding portion being distanced a first distance (D1) from the head axis (B), the first distance (D1) being at least 3 cm, the head portion being rotated with respect to the head axis (B), the head axis (B) being directed substantially parallel to the axis of rotation (A), in a view co-directional with the head axis (B) the entire holding portion having an angular extent (α) of less than 90° with respect to the head axis (B) and the entire holding portion being distanced a second distance (D2) from the axis of rotation (A), the second distance (D2) being greater than the radius (R) of the cutter.

Generally, the given distance (W) is less than 200 mm.

Typically, the given distance (W) is less than 50 mm.

In accordance with a first embodiment of the present invention, the key is "L" shaped having an integrally formed head portion, a front portion of the head portion constituting a driving portion and having a shape that mates with the shape of a screw head.

In accordance with a second embodiment of the present invention, the head portion of the key is provided with a ratchet (52).

In accordance with a third embodiment of the present invention, the key is provided with a torque measuring device (54).

In accordance with a fourth embodiment of the present invention, the key is provided with a swivel joint (56) located between the head portion and the holding portion.

In accordance with a fifth embodiment of the present invention, the key is provided with a resilient arm (58) that is connected between the head portion and the holding portion of the key, an open end (60) of the resilient arm is opposite the head portion of the key and spaced away therefrom.

In accordance with a sixth embodiment of the present invention, the key is provided with a pivotable double ended arm (62), a first end (66) of the arm is opposite the head portion of the key and spaced away therefrom and a second end (68) of the arm is opposite the holding portion of the key and spaced away therefrom.

In accordance with a seventh embodiment of the present invention, the head portion of the key is provided with a gear (72) and the key is operated by turning the holding portion around an axis (K) that is transverse to the head axis (B) of the key.

In accordance with a eighth embodiment of the present invention, the head portion (44) of the key is connected co-axially to a front end (77) of a flexible cable (74) retained within a body (82) of the key, a rear end (75) of the flexible cable is connected co-axially with the holding portion (46), the flexible cable being freely rotatable within the body (82) and the key is operated by turning the holding portion around an axis (K) that is transverse to the head axis (B) of the key.

In accordance with a ninth embodiment of the present invention, the head portion of the key is power operated.

If desired, the head portion of the key is detachably connected to the key.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
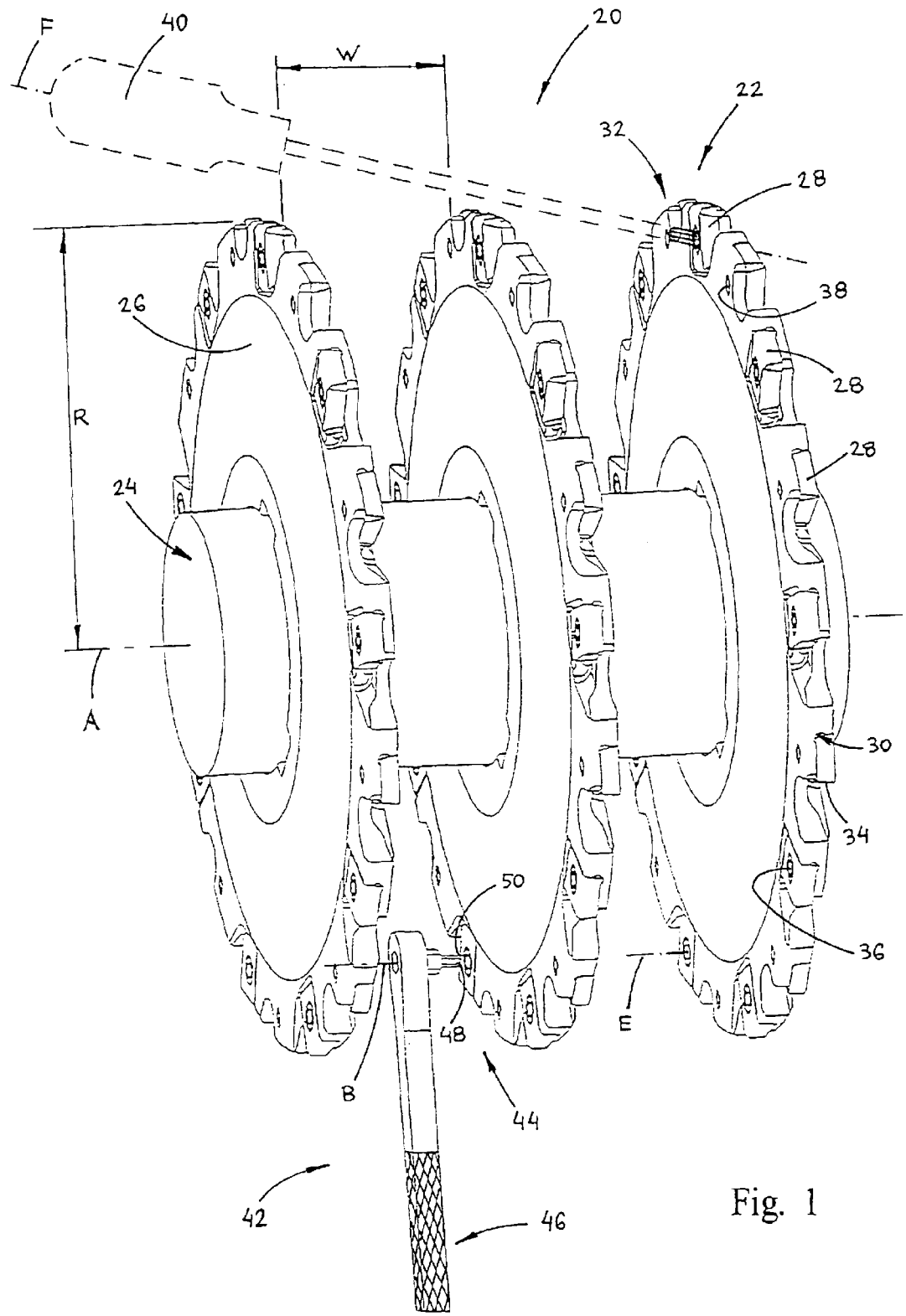
FIG. 1 is a perspective view of a cutting tool assembly according to the present invention showing the position of the key relative to one of the face mounted cutting inserts.

Attention is first drawn to FIG. 1. As shown, a cutting tool assembly 20 having an axis of rotation A comprises a plurality of cutters 22 coaxially mounted on a common shaft 24 and detachably connected thereto. Each cutter being axially displaced from an adjacent cutter by a given distance W. Usually, the distance W is less than 200 mm. In practice, especially when the cutting tool assembly 20 is used to machine car parts, the distance W is about 16 to 25 mm, regardless the thickness and diameter of the cutters. Each cutter 22 has a cutter body 26 in the general form of a circular disc having a radius R. For each cutter 22, cutting inserts 28 are mounted in insert receiving pockets 30 in the peripheral portion 32 of the cutter. The cutting inserts are intermittently arranged between right hand inserts and left hand inserts. In the described embodiment, all the cutters are of the same radius and hold the same kind of inserts. However, it should be noted that it is not an essential feature of the present invention and the different cutters can be of different size and construction.

Each cutting insert, having an operative cutting edge 34, is mounted in an insert receiving pocket and retained by a clamping screw 36 that threadingly engages a threaded bore 38 in the cutter body 26. Each clamping screw 36 lies along an axis E that is substantially parallel to the axis of rotation A.

The mounting of cutting inserts in the insert receiving pockets and their dismounting therefrom is carried out by a special key without the necessity to detach the cutters 22 from the shaft 24. As shown in FIG. 1, the distance W between two adjacent cutters is too short to enable the insertion of an ordinary key 40 (shown schematically in dashed lines in FIG. 1) between two cutters in a direction such that the axis of rotation F of the ordinary key 40 is substantially parallel to the axis of rotation of the cutter. Therefore, for securing a cutting insert 28 in an insert receiving pocket 30, the clamping screw 36 is first passed through a through bore in the cutting insert and threadingly engaged into the threaded bore 38 by the use, for example, of the ordinary key 40, screwdriver like, having a round torx head, until resistance is felt. Since the ordinary key cannot be placed substantially parallel to the axis of rotation A, it cannot apply sufficient tightening torque to the clamping screw without damaging the screw head. Therefore, the final tightening of the cutting insert is carried out by a special key according to the present invention as will be explained below. In a reverse operation, where it is necessary to replace a worn cutting insert, first the tightened screw has to be loosened by a special key and than can be freely unscrewed from the threaded bore by a common key.

Figure 12:
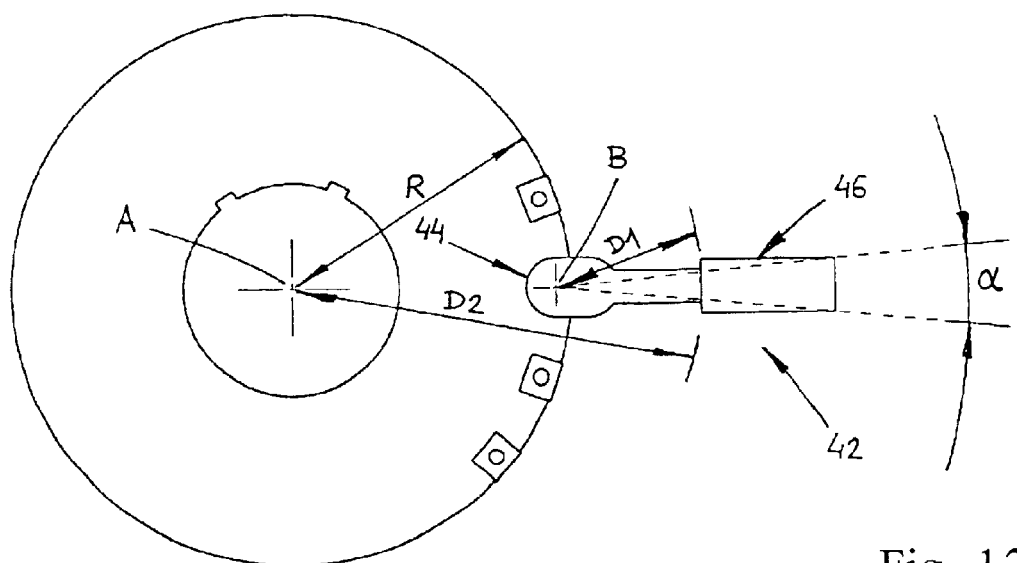
FIG. 12 is a schematical end view of a cutter and a key according to the present invention co-directional with the head axis of the key.

According to the present invention there is provided a key 42. The key 42 has a head portion 44, having a head axis B, and a holding portion 46 transversely directed to the head axis B, the holding portion 46 being distanced a first distance D1 from the head axis B (as shown in FIG. 12), the first distance DI being at least 30 mm. For tightening and loosening the clamping screw 36, the front end 48 of the head portion 44 engages the screw head 50 and the head portion being rotated with respect to the head axis B by turning the holding portion 46 around the head axis B, when the axis B being directed substantially parallel to the axis of rotation A. As is clearly seen in FIG. 10, that is a schematical view co-directional with the head axis B, the entire holding portion 46 having an angular extent α with respect to the head axis B. The angular extent being less than 90°. It is also seen that the entire holding portion 46 being distanced a second distance D2 from the axis of rotation A. The second distance D2 being greater than the radius R of the cutter.

Figure 2:
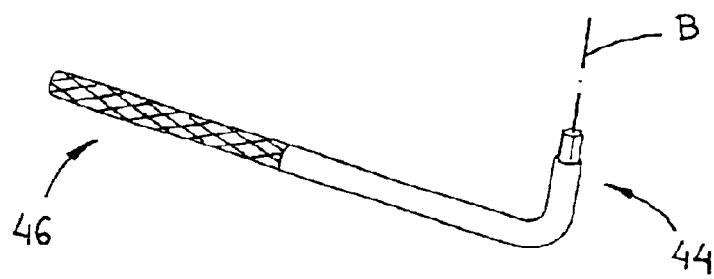
FIG. 2 is a perspective view of an "L" shaped key with an integrally formed head portion according to the present invention.
Figure 3:
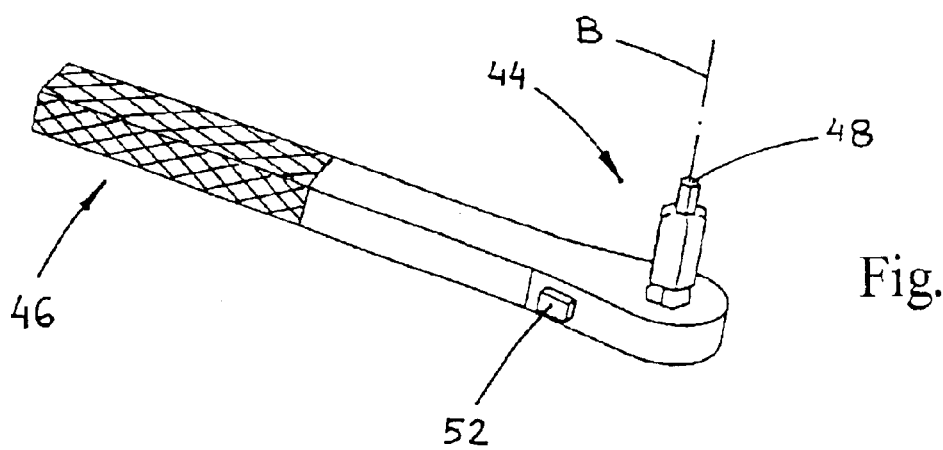
FIG. 3 is a perspective view of a key with a ratchet according to the present invention.

Attention is now drawn to FIGS. 2 to 11 that show different embodiments of a key according to the present invention. In the figures, like reference numerals refer to like parts. FIG. 2 shows an "L" shaped key with an integrally formed head portion 44, having a head axis B, and a holding portion 46. FIG. 3 shows a key where its head portion is provided with a ratchet 52. The ratchet action enables easy turning of the head portion 44 around the head axis B without the necessity to remove the front end 48 of the head portion 44 from the screw head 50. It is also seen in FIG. 3 that the head portion 44 can be in the form of a replaceable bit that is detachably connected to the key.

Figure 4:
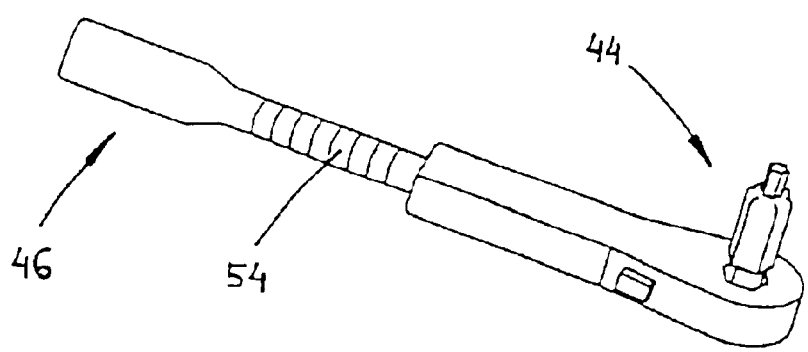
FIG. 4 is a perspective view of a key with a torque measuring device according to the present invention.
Figure 5:
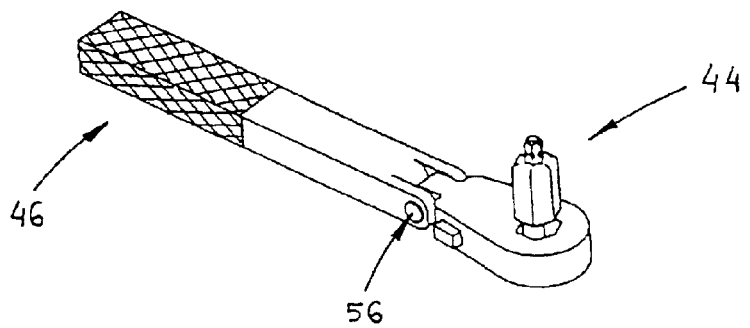
FIG. 5 is a perspective view of a key with a swivel joint according to the present invention.

FIG. 4 shows a key similar to the key in FIG. 3 where the key of FIG. 4 is further provided with a torque measuring device 54 located between the head portion 44 and the holding portion 46. The torque measuring device 54 enables better control on the tightening torque applied on the clamping screws. FIG. 5 shows a key similar to the key of FIG. 3 where the key of FIG. 5 is further provided with a swivel joint 56 located between the head portion 44 and the holding portion 46.

Figure 6:
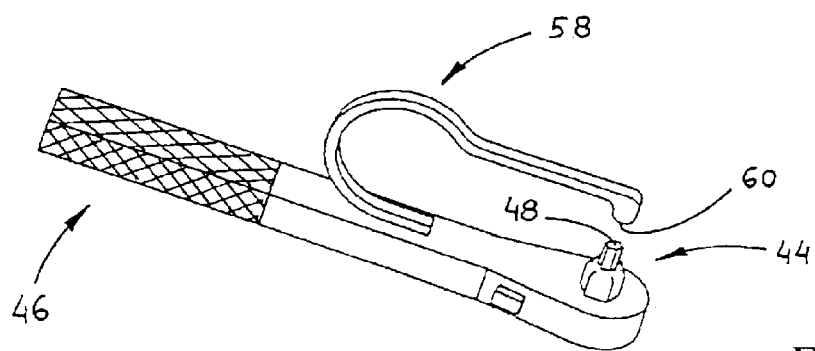
FIG. 6 is a perspective view of a key according to the present invention having a resilient arm opposite the head portion.

FIG. 6 shows a key similar to the key in FIG. 3 where the key of FIG. 6 is further provided with a resilient arm 58 that is connected between the head portion 44 and the holding portion 46. An open end 60 of the resilient arm is opposite the head portion 44 and is spaced away therefrom. When using the key of FIG. 6, the front end 48 of the head portion 44 engages the screw head 50 from one side of the cutter 22 while the open end 60 of the resilient arm 58 engages the other side of the cutter thus holding the head portion 44 of the key pressed against the screw head 50 and ensuring that the key will not loose its firm contact with the screw during tightening or loosening of the screw. By means of the above, it is possible to operate the key with one hand only without the need to support and press the head portion 44 against the screw head 50.

Figure 7:
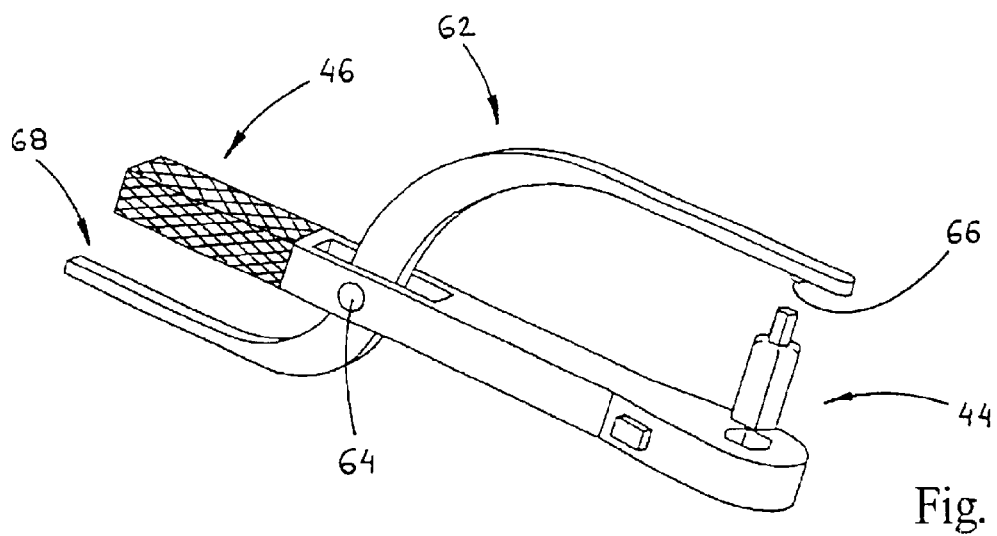
FIG. 7 is a perspective view of a key according to the present invention having a pivotable double ended arm.

FIG. 7 shows a key provided with a double ended arm 62 pivotable about an axis 64. A first end 66 of the arm 62 is opposite the head portion 44 of the key and spaced away therefrom. A second end 68 of the arm 62 is opposite the holding portion 46 of the key and spaced away therefrom. When using the key of FIG. 7, the front end 48 of the head portion 44 engages the screw head 50 from one side of the cutter 22 while the first end 66 of the arm 62 engages the other side of the cutter thus holding the head portion 44 of the key pressed against the screw head 50 and ensuring that the key will not loose its firm contact with the screw during tightening or loosening of the screw. The first end 66 is kept pressed against the cutter by means of the lever action created by the operator when holding tightly the second end of the arm urged against the holding portion 46.

Figure 8:
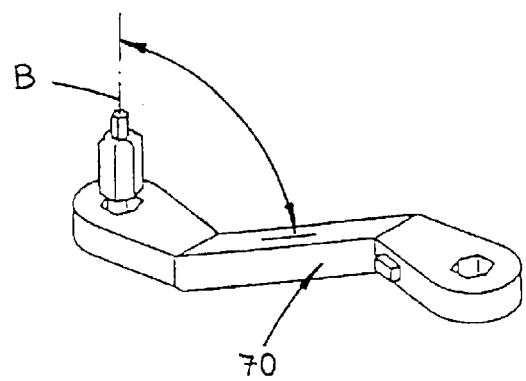
FIG. 8 is a perspective view of a key according to the present invention with a holding portion bended relative to the head portion.

FIG. 8 shows a key that can be used in both of its ends while the non-operative end serves as a holding portion 46. The key has a connecting portion 70 between its ends. The connecting portion 70 being directed at an acute angle β with respect to the head axis B.

Figure 9:
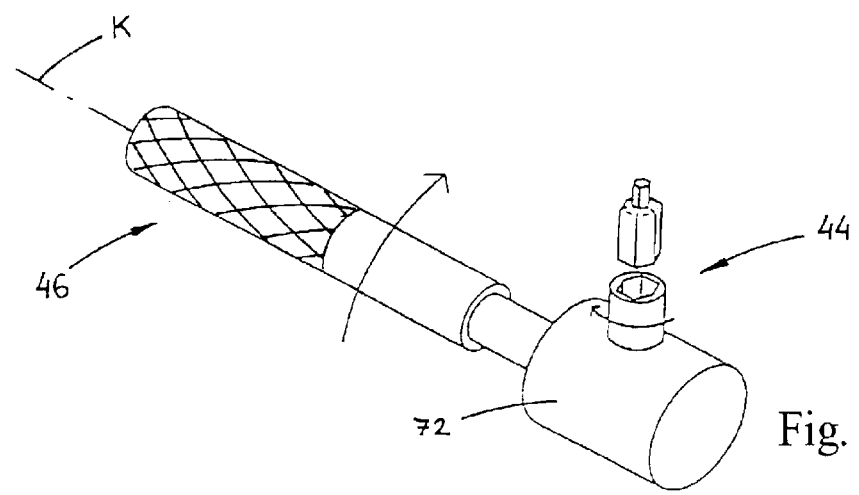
FIG. 9 is a perspective view of a key according to the present invention where the head portion is operated through a gear.

FIG. 9 shows a key provided with a gear 72 located between the head portion 44 and the holding portion 46. The key is operated by turning the holding portion 46 around an axis K that is preferably perpendicular to the head axis B. In a modified version of the key of FIG. 9, the head portion of the key is power operated by, for example, electrical or pneumatical means. Except of the ease of use of a power operated key, it involves another advantage in that the clamping screw can be completely screwed and tightly fastened, in an assembling operation, or can be completely loosened and removed in an disassembling operation, all in one action without the necessity to use two different keys.

Figure 10:
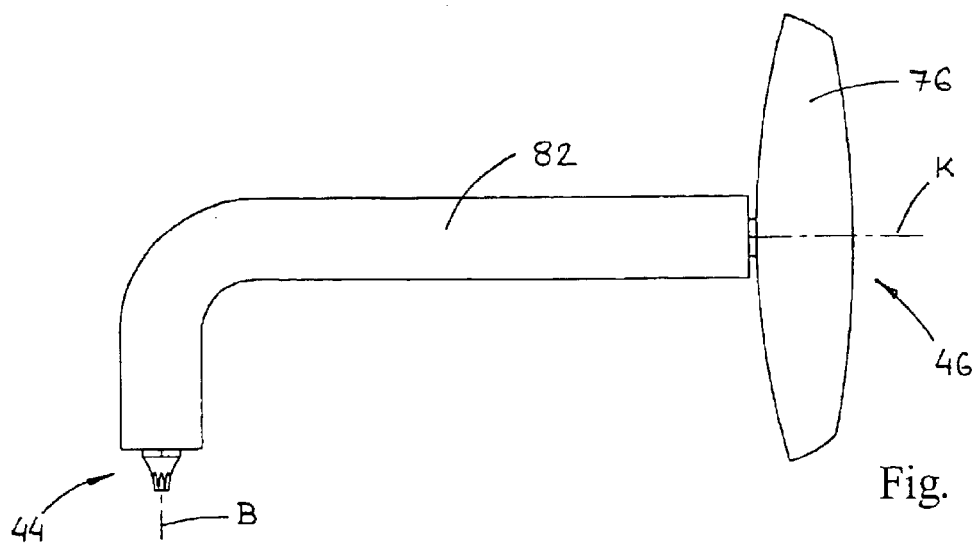
FIG. 10 is a side view of a key according to the present invention where the head portion is operated through a flexible cable.
Figure 11:
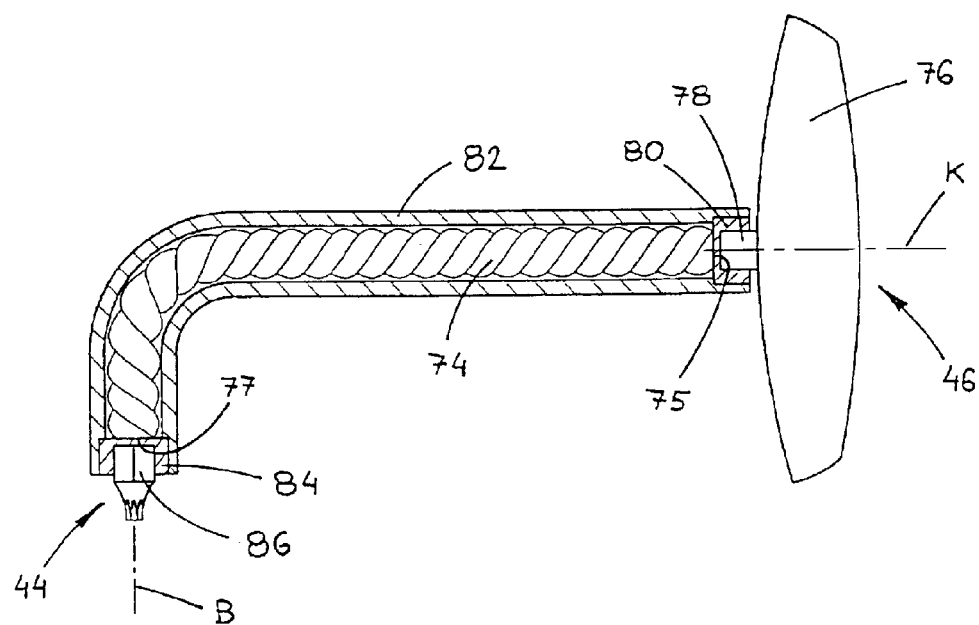
FIG. 11 is a sectional view of the key of FIG. 10.

FIGS. 10 and 11 show a key provided with a flexible cable 74 connecting between the head portion 44 and the holding portion 46. The key has a handle 76 whose driving portion 78 having an axis K is retained within a rear socket 80. The rear socket 80 is freely rotatable with respect to the body 82 of the key. A rear end 75 of the cable 74 is connected to the rear socket 80, preferably by brazing. A front end 77 of the cable 74 is connected, preferably by brazing, to a front socket 84 that is freely rotatable with respect to the body 82 of the key. A bit 86 is magnetically held within the front socket 84. The key is operated by turning the handle 76 around the axis K that is preferably perpendicular to the axis B of the bit.

It should be understood that the key of FIGS. 10 and 11 can be modified from the described above. For example, the bit 86 do not have to be magnetically held within the front socket 84 but can be integrally connected therewith. The front end 77 of the cable 74 can be directly connected to the bit. The rear end 75 of the cable can be directly connected to the handle 76.

Although the present invention has been described to a certain degree of particularity, it should be understood that various alterations and modifications could be made without departing from the spirit or scope of the invention as hereinafter claimed.

What is claimed is:

1. A method for assembling cutting inserts, the method comprising the steps of:
    (a) providing a rotary cutting tool assembly (20) comprising a plurality of coaxially mounted cutters (22) on a common shaft (24) having an axis of rotation (A), each cutter having a cutter body (26) in the general form of a circular disc, at least one of the plurality of cutters having a radius (R) and insert receiving pockets (30) in a peripheral portion (32) thereof, each of said insert receiving pockets having a threaded bore (38) substantially parallel to the axis of rotation (A), the at least one of the plurality of cutters being axially displaced from an adjacent cutter by a given distance (W),
    (b) locating a cutting insert (28) having a through bore in each of the insert receiving pockets, the through bore being substantially parallel to the axis of rotation (A),
    (c) securing each of the cutting inserts by means of a clamping screw (36) passing through the through bore and threadingly engaging the threaded bore (38), and
    (d) tightening each clamping screw with a key (42), the key having a head portion (44), having a head axis (B), engaging the clamping screw and a holding portion (46) connected to the head portion and transversely directed to the head axis (B), the holding portion being distanced a first distance (D1) from the head axis (B), the first distance (D1) being at least 30 mm, the head portion being rotated with respect to the head axis (B), the head axis (B) being directed substantially parallel to the axis of rotation (A), in a view co-directional with the head axis (B) the entire holding portion having an angular extent (α) being less than 90° with respect to the head axis (B) and the entire holding portion being distanced a second distance (D2) from the axis of rotation (A), the second distance (D2) being greater than the radius (R) of the cutter, and
    wherein steps (b), (c) and (d) are performed without dismantling the coaxially mounted cutters from the common shaft.

2. The method according to claim 1, wherein the given distance (W) is less than 200 mm.

3. The method according to claim 1, wherein the given distance (W) is less than 50 mm.

4. The method according to claim 1, wherein the key is "L" shaped having an integrally formed head portion, a front portion of the head portion constituting a driving portion and having a shape that mates with the shape of a screw head.

5. The method according to claim 1, wherein the head portion of the key is provided with a ratchet (52).

6. The method according to claim 1, wherein the key is provided with a torque measuring device (54).

7. The method according to claim 1, wherein the key is provided with a swivel joint (56) located between the head portion and the holding portion.

8. The method according to claim 1, wherein the key is provided with a resilient arm (58) that is connected between the head portion and the holding portion of the key, an open end (60) of the resilient arm is opposite the head portion of the key and spaced away therefrom.

9. The method according to claim 1, wherein the key is provided with a pivotable double ended arm (62), a first end (66) of the arm is opposite the head portion of the key and spaced away therefrom and a second end (68) of the arm is opposite the holding portion of the key and spaced away therefrom.

10. The method according to claim 1, wherein the head portion of the key is provided with a gear (72) and the key is operated by turning the holding portion around an axis (K) that is transverse to the head axis (B) of the key.

11. The method according to claim 1, wherein the head portion (44) of the key is connected co-axially to a front end (77) of a flexible cable (74) retained within a body (82) of the key, a rear end (75) of the flexible cable is connected coaxially with the holding portion (46), the flexible cable being freely rotatable within the body (82) and the key is operated by turning the holding portion around an axis (K) that is transverse to the head axis (B) of the key.

12. The method according to claim 1, wherein the head portion of the key is power operated.

13. The method according to claim 1, wherein the head portion of the key is detachably connected to the key.

14. A method of disassembling a cutting insert (28) belonging to a rotary cutting tool assembly (20), the assembly comprising a plurality of coaxially mounted cutters (22) on a common shaft (24) having an axis of rotation (A), each cutter having a cutter body (26) in the general form of a circular disc, at least one of the plurality of cutters having a radius (R) and insert receiving pockets (30) in a peripheral portion (32) thereof, said cutting insert (28) secured in one of said insert receiving pockets by means of a clamping screw (36) passing through a through bore of the cutting insert and threadingly engaging a threaded bore (38) of the insert receiving pocket (30), the threaded bore (38) and the through bore being substantially parallel to the axis of rotation (A), the at least one of the plurality of cutters being axially displaced from an adjacent cutter by a given distance (W), the method comprising the steps of:

(a) providing a first key (42), the fast key having a head portion (44) having a head axis (B) and a holding portion (46) transversely directed to the head axis (B);

(b) engaging the clamping screw of said cutting inset with the head portion, with the head axis (B) being directed substantially parallel to the axis of rotation (A), the holding portion being distanced a first distance (D1) from the head axis (B), the first distance (D1) being at least 30 mm, the holding portion being distanced a second distance (D2) from the axis of rotation (A), the second distance (D2) being greater than the radius (R) of the cutter;

(c) rotating the head portion with respect to the head axis (B) by rotating the holding portion (46) around the head axis (B), thereby un-tightening the clamping screw;

(d) further un-tightening the clamping screw until it exits the threaded bore;

(e) removing the clamping screw from the through bore; and (f) removing the given cutting insert, wherein steps (b), (c), (d), (e) and (f) are performed without dismantling the coaxially mounted cutters from the common shaft.

15. The method according to claim 14, wherein the given distance (W) is less than 200 mm.

16. The method according to claim 14, wherein the given distance (W) is less than 50 mm.

17. The method according to claim 14 wherein the key is "L" shaped having an integrally formed head portion, a front portion of the head portion constituting a driving portion and having a shape that mates with the shape of a screw head.

18. The method according to claim 14, wherein the head portion of the key is provided with a ratchet (52).

19. The method according to claim 14, wherein the key is provided with a torque measuring device (54).

20. The method according to claim 14, wherein the key is provided with a swivel joint (56) located between the head portion and the holding portion.

21. The method according to claim 14, wherein the key is provided with a resilient arm (58) that is connected between the head portion and the holding portion of the key, an open and (60) of the resilient arm is opposite the head portion of the key and spaced away therefrom.

22. The method according to claim 14, wherein the key is provided with a pivotable double ended arm (62), a first end (66) of the arm is opposite the head portion of the key and spaced away therefrom and a second end (68) of the arm is opposite the holding portion of the key and spaced away therefrom.

23. The method according to claim 14, wherein the head portion of the key is provided with a gear (72) and the key is operated by turning the holding portion around an axis (K) that is transverse to the head axis (B) of the key.

24. The method according to claim 14, wherein the head portion (44) of the key is connected co-axially to a front end (77) of a flexible cable (74) retained within a body (82) of the key, a rear end (75) of the flexible cable is connected co-axially with the holding portion (46), the flexible cable being freely rotatable within the body (82) and the key is operated by turning the holding portion around an axis (K) that is transverse to the head axis (B) of the key.

25. The method according to claim 14, wherein the head portion of the key is power operated.

26. The method according to claim 14, wherein the head portion of the key is detachably connected to the key.

* * * * *